Oct. 21, 1969
N. H. MAYHEW
3,473,328
PRESSURE MULTIPLYING BOOSTER
Filed Nov. 1, 1967
2 Sheets-Sheet 1
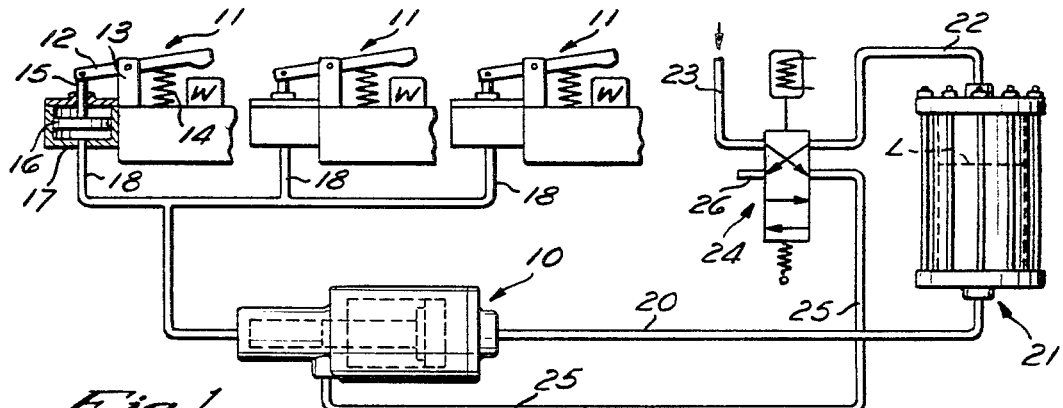
Fig. 1
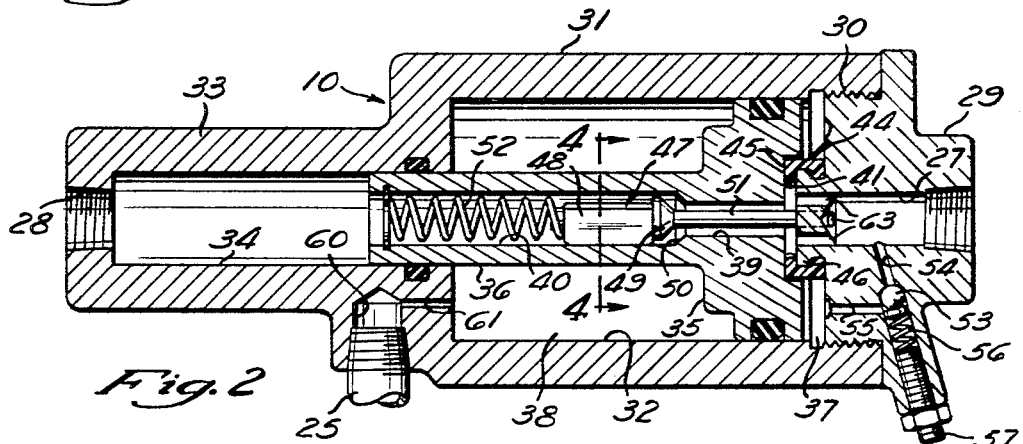
Fig. 2
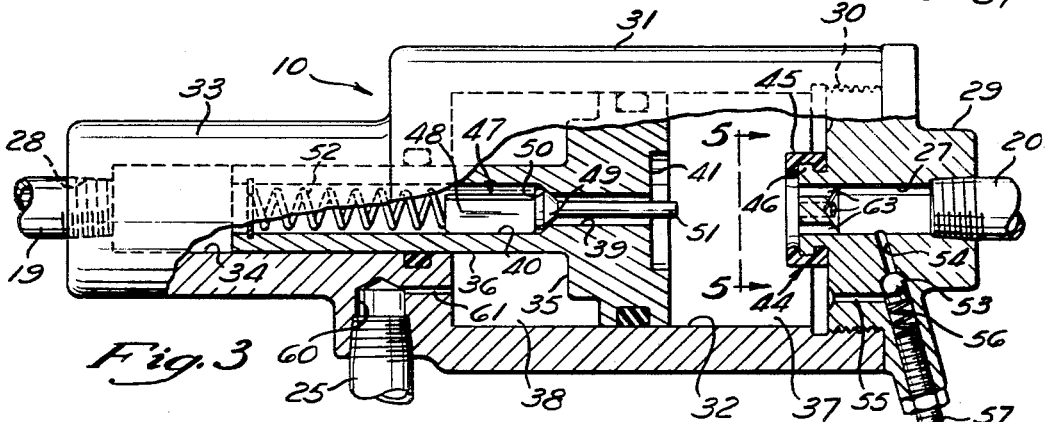
Fig. 3
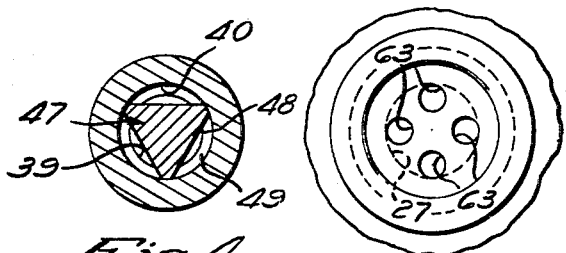
Fig. 4
Fig. 5
INVENTOR
NORMAN H. MAYHEW
BY
McNENNY, FARRINGTON,
PEARNE, & GORDON
ATTORNEYS Oct. 21, 1969
N. H. MAYHEW
3,473,328
PRESSURE MULTIPLYING BOOSTER
Filed Nov. 1, 1967
2 Sheets-Sheet 2
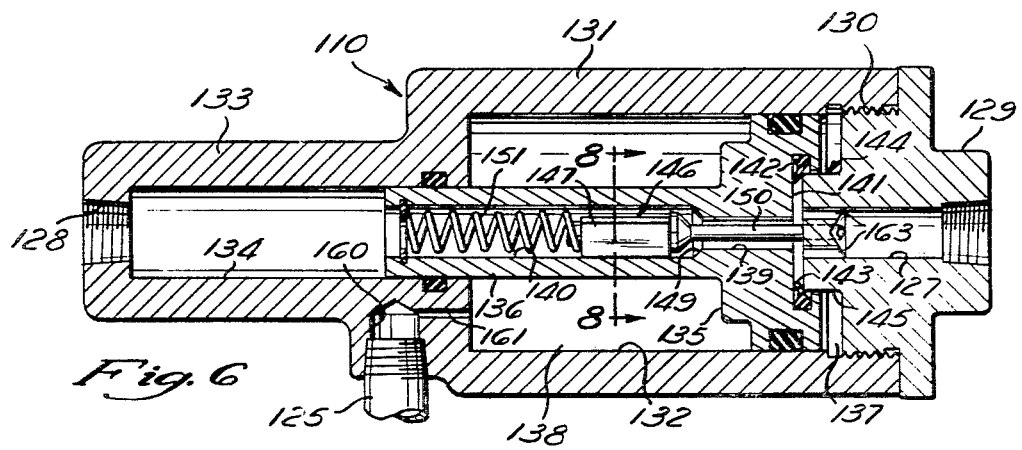
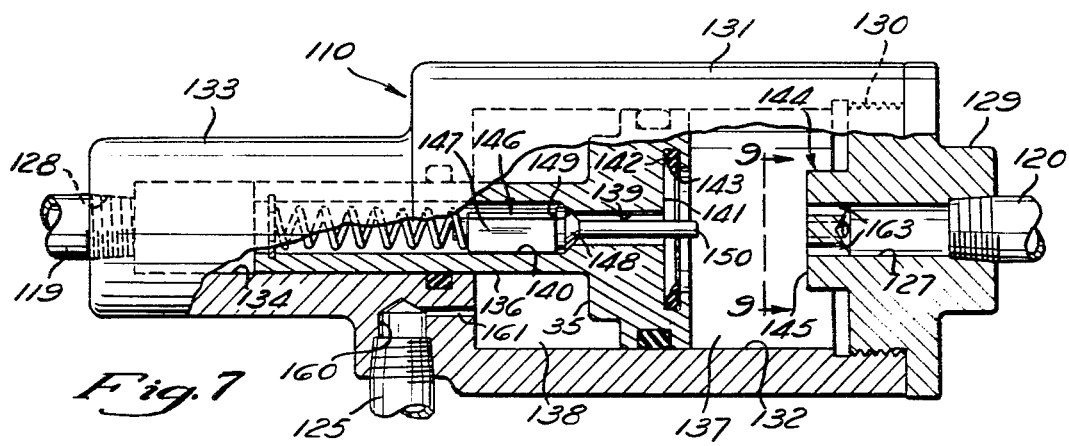
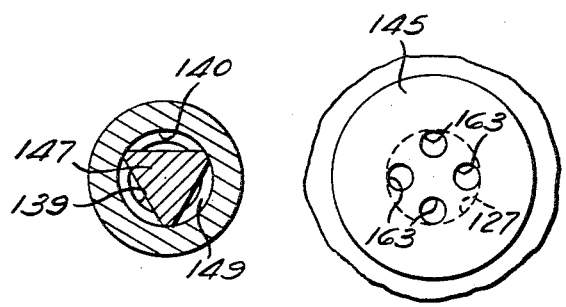
INVENTOR.
NORMAN H. MAYHEW
BY
MCNENNY, FARRINGTON,
PEARNE, & GORDON
ATTORNEYS United States Patent Office 3,473,328
Patented Oct. 21, 1969

3,473,328
PRESSURE MULTIPLYING BOOSTER
Norman H. Mayhew, Cleveland, Ohio, assignor to Jergens Tool Specialty Co., Cleveland, Ohio, a corporation of Ohio
Continuation-in-part of application Ser. No. 522,257, Jan. 21, 1966. This application Nov. 1, 1967, Ser. No. 679,816
Int. Cl. F15b 7/00, 15/17
U.S. Cl. 60—54.5                                  2 Claims

ABSTRACT OF THE DISCLOSURE

A pressure-multiplying device comprising a cylinder having a relatively large first bore and a relatively small second bore, a piston head slidably received in the first bore and dividing the first bore into first and second pressure chambers, and a piston rod connected to said piston head slidably received in the second bore. A passage means extends through the piston rod and piston head to establish fluid communication between the first pressure chamber and the second bore. A valve is provided in the passage and is held in an open position when the piston head abuts one end of the first bore and is closed when the piston head moves a predetermined distance away from that one end. The piston head, when it abuts one end of the cylinder, isolates a first portion of the first pressure chamber from a second portion of that chamber. Upon the application of a predetermined pressure in the isolated first portion of the chamber, the piston head moves away from one end of the cylinder to close the valve and multiply the pressure between the first bore and the second bore.

---

This application is a continuation-in-part of application Serial No. 522,257, filed January 21, 1966, and now abandoned.

This invention relates to pressure-multiplying means and, more particularly, to an assembly for increasing fluid pressure in response to flow restriction.

In many hydraulic control systems it is desirable to include in the system devices which will permit fluid flow to remote portions of the system and which will provide an increase in the downstream pressure by multiplying the upstream pressure when there is flow restriction in the system. For example, in automotive hydraulic braking systems it is desirable to supply hydraulic fluid under a relatively low pressure to the individual wheel cylinders while the brakeshoes are being advanced to the brake drums. When there is contact between the brakeshoes and drums, it is then desirable to increase the fluid pressure in the wheel cylinders. It has therefore been proposed to provide a power booster or pressure multiplying device in an automotive braking system which increases fluid pressure when the brakeshoes have contacted their drums. One such system is shown in U.S. Patent No. 3,010,282 to Jansson. In the Jansson patent means are provided to ensure that fluid will flow from the master cylinder to the wheel cylinders prior to the multiplication of pressure when the brakeshoes contact their brake drums. Such means include relatively strong springs which bias the pressure multiplying pistons at one end of their power stroke. While such means ensure that the flow from the master cylinder to the wheel cylinders will be unrestricted until a predetermined pressure obtains, such springs inherently necessitate the application of increased pressure in accordance with their spring rate.

It has been customary to employ pressure-multiplying devices in applications involving the clamping of a workpiece to the bed of a machine tool. In those applications, relatively low pressure air, for example, air at a pressure of 100 p.s.i., is supplied to a cylinder chamber. A piston head is slidably mounted in the cylinder chamber and the air pressure is applied to the relatively large face of the piston head. A piston rod is fixed to the piston head and is slidably received by a hydraulic cylinder. The cross sectional area of the hydraulic cylinder and its slidably mounted piston rod is substantially less than that of the piston head so that the pressure exerted by the air is multiplied in the hydraulic cylinder according to the area difference between the piston head on the one hand and the piston rod on the other hand. These conventional pressure-multiplying devices supply a desirably high pressure during the clamping operation. However, a relatively large portion of the working stroke of the piston rod must be employed to cause the clamps to advance toward the workpiece. Where operations are repetitive, large amounts of air are consumed, requiring high and expensive air capacity in the shop. The number of hydraulic clamping units that can be connected to such a pressure multiplier is limited to the capacity of the hydraulic cylinder in the pressure multiplier.

It is, accordingly, an object of the present invention to provide a pressure-multiplying assembly which will supply fluid at a relatively low pressure and which will increase such fluid pressure in response to flow restriction.

Another object is to provide a system that uses reservoir capacity to feed fluid to lines leading to one or more clamping units, reserving the fluid capacity of the pressure multiplier itself for high pressure feeding after low pressure requirements are met. The pressure-multiplying assembly is used to supply fluid at a relatively low pressure to a number of hydraulic clamping units and to increase the pressure after the clamping units have engaged their workpieces.

Another object of the present invention is to provide a pressure-multiplying assembly which will supply fluid at a relatively low pressure and which will increase such fluid pressure when any one of a number of preselected pressures is attained as the flow is restricted.

A pressure-multiplying assembly according to this invention includes a piston head which is mounted for unopposed movement in a cylinder chamber. Means are provided to permit fluid flow from a reservoir through the assembly until there is substantial resistance to further flow and a consequent increase in pressure caused by clamping engagement. Upon such increase in pressure, the pressure is multiplied by the assembly.

A pressure-multiplying assembly according to another aspect of this invention includes a piston head which is mounted for unopposed movement in a cylinder chamber. Means are provided to permit fluid flow from a reservoir through the assembly until there is substantial resistance to further flow and a consequent predetermined increase in pressure in the assembly. Upon such predetermined increase in pressure, the pressure is multiplied by the assembly. This aspect of the invention is particularly suited for installations wherein clamping or pressure-applying devices may be added to the system. In such systems, the added devices may, by their linkage design, offer resistance to flow which is sufficient to cause a consequent increase in pressure sufficient to move the piston head prematurely prior to clamping engagement. Such premature movement, according to this aspect of the invention, is obviated by providing a pressure-multiplying assembly wherein adjusting means are provided to ensure that the pressure-multiplying piston will not move until a predetermined pressure obtains. Further in accordance with this aspect of the invention, the clamping cycle time is reduced by minimizing any time lag between the time that the clamping units have engaged their workpieces and the time that high pressure is applied to those clamping units.

These and other objects and advantages of the invention will become apparent from the following description and accompanying drawings.

In the drawings:

FIG. 1 is a schematic view of a hydraulic circuit in which the device according to this invention may be employed;

FIG. 2 is a cross sectional view of the device according to one aspect of this invention, showing the components of the device in a first position;

FIG. 3 is a partial cross sectional view of the device illustrated in FIG. 2, showing certain components at a second position;

FIG. 4 is an enlarged cross sectional view, the plane of the section being indicated by the line 4—4 in FIG. 2;

FIG. 5 is an enlarged view of a portion of the device, the plane of the section being indicated by the line 5—5 in FIG. 3;

FIG. 6 is a cross sectional view of the device according to a further aspect of this invention, showing the components of the device in a first position;

FIG. 7 is a partial cross sectional view of the device illustrated in FIG. 6, showing certain components at a second position;

FIG. 8 is an enlarged, cross sectional view, the plane of the section being indicated by the line 8—8 in FIG. 6; and FIG. 9 is an enlarged view of a portion of the device, the plane of the section being indicated by the line 9—9 in FIG. 7.

Referring now to FIGS. 1 through 5 of the drawings, a pressure-multiplying device 10 is illustrated. The device 10 is illustrated in FIG. 1 in a hydraulic circuit which supplies hydraulic fluid to a plurality of clamps 11. Each clamp 11 may comprise a lever arm 12 pivoted to a post 13 and biased upwardly away from a workpiece W by a spring 14. Force is applied to one end of the lever arm 12 by a piston rod 15 which is driven by a piston head 16. The piston head 16 is mounted in a hydraulic cylinder 17 and fluid is supplied to each cylinder 17 by conduits 18. The conduits 18 are connected to a high pressure conduit 19 which is, in turn, attached to the device 10. Low pressure hydraulic fluid is supplied to the device 10 through a low pressure conduit 20 from a reservoir 21. The reservoir 21 is partially filled with hydraulic fluid to, for example, the level L indicated in FIG. 1. The top portion of the reservoir 21 may be supplied with pressurized air through a conduit 22 from a supply line 23. A solenoid-operated four-way valve 24 is provided between the supply line 23 and the conduit 22 and, in the position shown, the four-way valve 24 supplies pressurized air from the supply line 23 to a conduit 25 and permits air to exhaust from the reservoir 21 to an exhaust port 26.

Reversing the valve 24 from its illustrated position connects the supply line 23 to the conduit 22 to supply pressurized air to the reservoir 21. Reversal of the valve 24 also connects the conduit 25 to the exhaust port 26. As will be explained in greater detail, when the valve 24 is reversed and air pressure is applied to the hydraulic fluid in the reservoir 21, the hydraulic fluid is forced through the conduit 20, the device 10, the conduit 19, and to each cylinder 17. This flow continues until each piston head 16 is moved an amount which is sufficient to cause each lever 12 to contact its workpiece. When each lever 12 contacts its workpiece, the device 10 supplies high pressure hydraulic fluid to each cylinder 17 to securely clamp each workpiece.

Referring now to FIG. 2, the device 10 is illustrated in a position which permits hydraulic fluid to flow into an inlet port 27 (which in FIG. 1 is connected to a conduit 20) and out of an outlet port 28 (which in FIG. 1 is connected to the conduit 19). The inlet port 27 is drilled into a cap 29 which is threaded into a counterbore 30 in a cylinder casing 31. The cylinder casing 31 is provided with a cylinder bore 32 and has a reduced neck portion 33. The reduced neck portion 33 is provided with an axial bore 34 which communicates with the bore 32 and the outlet port 28.

A piston head 35 is slidably mounted in the bore 32 and has a piston rod 36 associated therewith which is slidably received in the bore 34. The piston head 35 divides the cylinder 32 into first and second pressure chambers 37 and 38 respectively. The port 27 communicates with the first pressure chamber 37 by a series of ports 63 in the cap 29. The first pressure chamber 37 is in fluid communication with the bore 34 through a bore 39 in the piston head 35 and a counterbore 40 in the piston rod 36. The piston head 35 is provided with a cylindrically relieved portion 41 which constitutes a first portion of the first pressure chamber 37. At one end of its stroke, the piston head butts against a stop means 44. The stop means 44 comprises a portion of the cap 29 which projects axially into the recessed portion 41 of the piston head 35. The stop means 44 is provided with a radial lip 46 and a sealing gasket 45 is snapped over the lip 46. The flat wall of the recessed portion 41 butts against the gasket 45 and there is provided a very slight clearance between the cylindrical side wall of the gasket 45 and the cylindrical side wall of the recessed portion 41, which comprises means to isolate the first portion of the first pressure chamber 37 (the recessed portion 41) from a second portion of the first pressure chamber (the remainder of the first pressure chamber 37) when the piston head 35 is in the position illustrated in FIG. 2.

In the position illustrated in FIG. 2, fluid is permitted to flow through the inlet opening 27, the ports 63, the recessed portions 41, the bore 39, and into the bore 40 past a valve means 47. The valve means 47 includes a triangular body portion 48 which slides in the bore 40, a closure member 49 which is adapted to engage a seat formed by a shoulder 50 between the bore 39 and the counterbore 40, and a rod 51 which projects from the closure member 48 into the bore 39. The valve means 47 is normally biased toward the inlet port 27 by by a spring 52. In the position illustrated in FIG. 2, the closure member is held in an open position, since in that position the rod 51 butts against the stop means 44. With the valve means 47 thus held in its open position, fluid is permitted to flow from the reservoir 21, through the device 10, and into each cylinder 17. This flow continues until each lever arm has contacted its workpiece. When each lever arm contacts its workpiece, there is a resistance to flow in the system and the pressure throughout the circuit increases.

An increase in pressure throughout the circuit opens a ball check valve 53 so that fluid may flow through a passageway 54 which communicates with the inlet port 27 and then through a passageway 55 to the second portion of the first pressure chamber 37. The ball check valve 53 is opened only when a predetermined pressure obtains in the inlet port 27 and, therefore, in the system, To this end, the ball check valve 53 is biased in its closed position by a spring 56. The pressure which the spring exerts against the ball check valve 53 may be adjusted by an adjusting screw 57.

Resistance to flow in the system and the consequent pressure increase throughout the circuit opens the valve 53 when the pressure reaches a preselected value to admit the fluid pressure to the portion of the piston head 35 which is unisolated by the gasket 45. Prior to the application of fluid pressure to this unisolated portion, the piston head remains stationary in the position illustrated in FIG. 2, since the isolated area of the piston head 35 is smaller than the cross sectional area of the bore 34, thus resulting in a force on the piston head which tends to keep it biased to the right as viewed in FIG. 2.

As the piston 35 begins its movement to the left, upon the previously described application of pressure to the unisolated portion of the piston head 35 through the passageways 54 and 55, the cylindrical side wall portion of the recessed portion 41 moves away from the stop means 44, thereby placing the recessed portion 41, and therefore the inlet port 27, in direct fluid communication with the entire first pressure chamber 37. The fluid pressure is thereby applied to the entire cross section of the piston head 35. Since the valve means 47 is biased to the right by the spring 52, the closure member is urged into contact with the seat 50 when the pin 51 is moved from its butting relationship with the stop means 44. When the valve means 47 closes, it is held in a closed position by the spring 52 and by the relatively high pressure which has developed in the bore 34. Thus, the piston head 35 and its rod 36 function as a solid member to multiply the relatively low pressure in the first pressure chamber to a relatively high pressure in the bore 34. As the piston head 35 moves to the left, the air in the second pressure chamber is exhausted ahead of the piston through a passageway 61, the line 25, and to an exhaust port 26.

The lever arms 12 may be released from their workpieces by returning the four-way valve 24 to the position illustrated in FIG. 1. In that position, the pressure on the surface of the hydraulic liquid within the reservoir 21 is ported through the conduit 22 to the exhaust port 26. Simultaneously, fluid pressure is admitted to the second pressure chamber 38 through the conduit 25 to drive the piston head 35 to the right. Since the fluid in the first pressure chamber 37 is subjected to atmospheric pressure, the movement of the piston head 35 to the right is substantially unopposed. After the pin 50 contacts the stop means 44 to thereby open the closure member 48, fluid is exhausted from each cylinder 17 to the reservoir.

The pressure-multiplying assembly described above reacts rapidly to predetermined low pressure values to multiply such pressures and is particularly suited for installations wherein additional clamping units are added to the system and those units require greater initial closure pressure than the remaining units in the system. According to another aspect of this invention, a pressure-multiplying system is provided which multiplies low pressure to high pressure when the single fixed low pressure obtains in the system.

Referring now to FIGS. 6 through 9 of the drawings, a pressure-multiplying device 110 according to this further aspect of the invention is illustrated. The pressure-multiplying device 110 may be connected to the plurality of clamps 11 illustrated in FIG. 1 by the conduit 19 and may be connected to the reservoir 21 by a conduit 120. The device 110 is connected to the solenoid-operated four-way valve by a conduit 125.

Referring now to FIG. 6, the device 110 is illustrated in a position which permits hydraulic fluid to flow into the inlet port 127 (which in FIG. 7 is connected to the conduit 120) and out of an outlet port 128 (which in FIG. 7 is connected to the conduit 119). The inlet port 127 is drilled into a cap 129 which is threaded into a counterbore 130 in a cylinder casing 131. The cylinder casing 131 is provided with a cylinder bore 132 and has a reduced neck portion 133. The reduced neck portion 133 is provided with an axial bore 134 which communicates with the bore 132 and the outlet port 128.

A piston head 135 is slidably mounted in the bore 132 and has a piston rod 136 associated therewith which is slidably received in the bore 134. The piston head 135 divides the cylinder 132 into first and second pressure chambers 137 and 138 respectively. The port 127 communicates with the first pressure chamber 137 by a series of ports 163 in the cap 129. The first pressure chamber 137 is in fluid communication with the bore 134 through a bore 139 in the piston head 135 and a counterbore 140 in the piston rod 136. The piston head 135 is provided with a cylindrically relieved portion 141 which constitutes a first portion of the first pressure chamber 137. The relieved portion 141 includes an annular recess 142 within which a sealing gasket 143 is inserted. At one end of its stroke, the piston head butts against a stop means 144. The stop means 144 comprises a cylindrical portion 145 of the cap 129 which projects axially into the recessed portion 141 of the piston head 135. There is provided a very slight clearance between the cylindrical side wall of the portion 145 and the cylindrical side wall of the recessed portion 141, which comprises means to isolate the first portion of the first pressure chamber 137 (the recessed portion 141) from a second portion of the first pressure chamber (the remainder of the first pressure chamber 137) when the piston head 135 is in the position illustrated in FIG. 6. Resistance to flow of fluid through, and consequently pressure reduction across, this clearance obtains even when the gasket 143 is omitted, and in this respect such isolation exists in the FIG. 6 position even when the gasket 143 is omitted.

In the position illustrated in FIG. 6, fluid is permitted to flow through the inlet opening 127, the ports 163, the recessed portions 141, the bore 139, and into the bore 140 past a valve means 146. The valve means 146 includes a triangular body portion 147 which slides in the bore 140, a closure member 148 which is adapted to engage a seat formed by a shoulder 149 between the bore 139 and the counterbore 140, and a rod 150 which projects from the closure member 148 into the bore 139. The valve means 146 is normally biased toward the inlet port 127 by a spring 151. In the position illustrated in FIG. 6, the closure member is held in an open position, since in that position the rod 150 butts against the stop means 144. With the valve means 146 thus held in its open position, fluid is permitted to flow from the reservoir 21, through the device 110, and into each cylinder 17. This flow continues until each lever arm has contacted its workpiece. When each lever arm contacts its workpiece, there is a resistance to flow in the system and the pressure throughout the circuit increases.

Since the cross sectional area of the recessed portion 141 is greater than the cross sectional area of the bore 134, the piston head 135 is driven to the left when a predetermined pressure obtains. It should be noted that the piston head is not moved to the left until a predetermined pressure is reached in the recessed portion 141, since the pressure isolated in the portion 141 exerts a relatively small force on the piston head and this small force is at least balanced by friction between the piston head 135 and the cylinder 132 and between the piston rod 136 and the bore 134. When the four-way valve 24 connects the line 23 to the line 22, the conduit 125 is connected to the exhaust port 26. As may be seen in FIGS. 6 and 7, the conduit 125 is connected to a port 160. The port 160 communicates with the second pressure chamber 138 through a small diameter port 161. Thus, even though movement of the piston head 135 to the left is substantially unopposed, the piston head will not move until the force exerted on the piston head in the chamber 141 overcomes the previously discussed frictional forces.

As the piston 135 begins its movement to the left, upon the previously described increase in pressure within the recessed portion 141, the cylindrical side wall portion of the recessed portion 141 moves away from the cylindrical stop means 144, thereby placing the recessed portion 141, and therefore the inlet port 127, in fluid communication with the first pressure chamber 137. The fluid pressure is then applied to the entire cross section of the piston head 135. Since the valve means 146 is biased to the right by the spring 151, the closure member is urged into contact with the seat 149 when the pin 150 is moved from its butting relationship with the stop means 144. When the valve means 146 closes, it is held in a closed position by the spring 151 and by the relatively high pressure which is developed in the bore 134. Thus, the piston head 135 and its rod 136 function as a solid member to multiply the relatively low pressure in the first pressure chamber to a relatively high pressure in the bore 134.

The lever arms 12 may be released from their workpieces by returning the four-way valve 24 to the position illustrated in FIG. 1. In that position, the pressure on the surface of the hydraulic liquid within the reservoir 21 is ported through the conduit 22 to the exhaust port 26. Simultaneously, fluid pressure is admitted to the second pressure chamber 138 through the conduit 125 to drive the piston head 135 to the right. Since the fluid in the first pressure chamber 137 is subjected to atmospheric pressure, the movement of the piston head 135 to the right is substantially unopposed. After the pin 150 contacts the stop means 144 to thereby open the closure member 148, fluid is exhausted from each cylinder 17 to the reservoir.

The invention is not restricted to the slavish imitation of each and every one of the details described above, which have been set forth merely by way of example with the intent of most clearly setting forth the teaching of the invention. Obviously, devices may be provided which change, eliminate, or add mechanical structure without departing from the invention.

What is claimed is:

1. A pressure-multiplying assembly for increasing fluid pressure in response to flow restriction, comprising a cylinder chamber, a piston head slidably mounted in said cylinder chamber and dividing said cylinder chamber into first and second pressure chambers, said first pressure chamber having stop means defining the limit of the stroke of said piston head, a piston rod associated with said piston head and slidable therewith, said piston rod being slidably mounted in a bore having a cross sectional area less than the cross sectional area of said cylinder chamber, first passage means establishing fluid communication between said first chamber and said bore, valve means for closing said first passage means, means for hold said valve means in an open condition when said piston head is positioned within a predetermined axial distance from said stop means, and means responsive to an increase in pressure in said bore and said first passage means to move said piston head through said predetermined axial distance; said pressure-responsive means including isolation means to isolate pressure in said first passage means and a first portion of said first chamber from a second portion of said first chamber, second passage means establishing fluid communication between said first portion of said first chamber and said second portion of said first chamber, and a valve in said second passage means which is opened only in response to a predetermined pressure in said first portion of said first chamber to admit said predetermined pressure to said second portion of said first chamber.

2. A pressure-multiplying assembly for increasing fluid pressure in response to flow restriction, comprising a cylinder chamber, a piston head slidably mounted in said cylinder chamber and dividing said cylinder chamber into first and second pressure chambers, said first pressure chamber having stop means defining the limit of the stroke of said piston head, a piston rod associated with said piston head and slidable therewith, said piston rod being slidably mounted in a bore having a cross sectional area less than the cross sectional area of said cylinder chamber, first passage means establishing fluid communication between said first chamber and said bore, valve means for closing said first passage means, means to hold said valve means in an open condition when said piston head is positioned within a predetermined axial distance from said stop means, and means responsive to an increase in pressure in said bore and said first passage means to move said piston head through said predetermined axial distance; said pressure-responsive means including isolation means to isolate pressure in said first passage means and a first portion of said first chamber from a second portion of said first chamber, the cross sectional area of said first portion of said first chamber being less than the cross sectional area of said piston rod, second passage means establishing fluid communication between said first portion of said first chamber and said second portion of said first chamber, a one-way check valve in said second passage means which is opened only in response to a predetermined pressure in said first portion of said first chamber to admit said predetermined pressure to said second portion of said first chamber, said check valve being biased in its closed position by a spring, and means to vary the biasing force exerted by said spring.

References Cited

UNITED STATES PATENTS

| | | |
|---|---|---|
| 1,970,999 | 8/1934 | Ferris et al. |
| 2,351,953 | 11/1939 | Goepfrich. |
| 2,372,015 | 3/1945 | Rockwell. |
| 2,642,720 | 6/1953 | Deardorff. |
| 2,656,745 | 10/1953 | Forichon. |
| 3,010,282 | 11/1961 | Jansson. |
| 3,218,934 | 11/1965 | Daniels _____ 91—26 |
| 3,303,746 | 2/1967 | Schmoeger _____ 91—26 |

PAUL E. MASLOUSKY, Primary Examiner

U.S. Cl. X.R.

91—26, 401, 416; 92—110